United States Patent

[11] 3,586,431

[72] Inventor Gordon Fraser
      353 W. 57th St., New York, N.Y. 10019
[21] Appl. No. 723,656
[22] Filed Apr. 24, 1968
[45] Patented June 22, 1971
[32] Priority Dec. 1, 1967
[33] Italy
[31] 795592

[54] MICROFILM PROJECTOR WITH REEL SELECTION MECHANISM
     1 Claim, 8 Drawing Figs.
[52] U.S. Cl. .................................................. 353/26, 353/68, 352/123
[51] Int. Cl. ...................................................... G03b 23/12
[50] Field of Search ........................................ 353/25, 68, 26; 352/123

[56] References Cited
UNITED STATES PATENTS

| | | | |
|---|---|---|---|
| 2,290,071 | 7/1942 | Rinaldy ........................ | 352/123 |
| 2,280,750 | 4/1942 | Emerson ...................... | 353/26 |
| 2,998,748 | 9/1961 | Dessilani ..................... | 352/123 |
| 3,041,926 | 7/1962 | Granelli........................ | 352/123 |
| 3,098,409 | 7/1963 | Mathieu ....................... | 353/26 X |
| 3,225,652 | 12/1965 | Sauppe......................... | 353/25 |
| 3,367,590 | 2/1968 | Girard........................... | 352/123 X |

Primary Examiner—William D. Martin, Jr.

ABSTRACT: This invention relates to a multiple reel microfilm projector having mechanism for reel selection by "pushbutton" operation, and providing for shifting from one reel to another without the necessity of rewinding reels prior to such reel change, and making possible the storage of a large number of microfilm images in a relatively small space, instantly available without changing reels one at a time as usually is done in present microfilm projectors.

INVENTOR.
Gordon Fraser

INVENTOR.
Gordon Fraser

INVENTOR.
Gordon Fraser

MICROFILM PROJECTOR WITH REEL SELECTION MECHANISM

DESCRIPTION OF INVENTION AND OF OPERATION

The process through which photograms are brought in succession before the optical members, consisting of a lamp or some kind of light source, and lenses, being already well known, the invention is particularly concentrated on the requirement of accumulation and automatic replacement of microfilms or films, or in other words, on the requirement that one or other of the microfilms be brought by means of controls before the optical projecting system consisting of lamps and lenses.

In practice, the unit consists of a centralized light source fitted with projecting lenses, with, all around it, on a mobile stand, a group made up of many microfilms and films ready to be projected, since they are in fact stretched between a winding and an unwinding reel. It is precisely the stretched part of each film that is brought to coincide with the optical projecting mechanism when the stand by revolving, causes the reels to move round in a circle.

The rotation of said stand that, similar to a large spool, consists of a cylinder or a tube fitted with terminal flanges, is brought about automatically by the action of an electric motor, and its predetermined stopping, also automatic, is controlled by a selecting keyboard inserted in an electric circuit. In the course of a complete revolution of the film or microfilm carrier, all of the films, and particularly the portion stretched between the two reels, pass before the optical projecting device. Automatic stopping of the spool will take place when the required film determined by the key that has been pushed down, coincides with the optical device.

The first thing to do to start the appliance is, evidently, to apply to it an electric current. One then presses the selecting key corresponding to the microfilm required. The spool, automatically freed, rotates and operates a contactor that controls automatic stopping; it stops when the contact corresponding to the circuit of the required film is made to open, and thus the spool is once again clamped. By operating another control, in either of the two directions, the selected film is made to slide across the optical device's projecting field, towards either of the two winding reels. In connection with each reel there will be a small two-speed motor imparting slow or fast movement to the film. The motor is fitted with a clutch for transmitting the movement to the reel and an electromagnetic organ for putting the reel in or off contact. Further particulars will appear from the descriptions and drawings.

The unit may be built in various sizes and hence, capacities. One may assemble in it microfilms of treatises or books, entire dictionaries, photographic reproductions etc. and the whole may be cataloged, numbered and automatically recalled by properly operating the controls.

In the attached drawings the invention is illustrated exemplicatively and schematically, in one of its unlimited possible shapes. Obviously, any other way in which it may be built, following the same conception and actuating principles, will be included in the range of the invention and of its patent.

Figure 1:
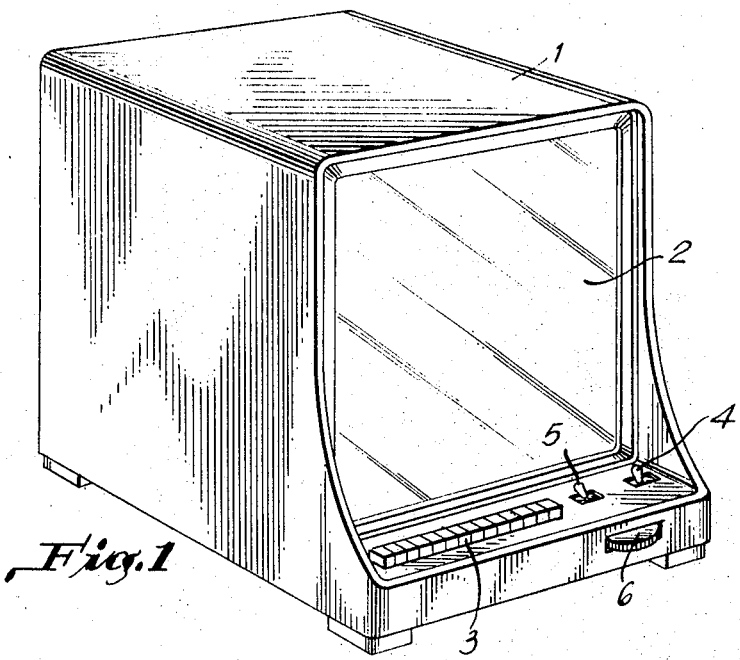
FIG. 1 shows the unit seen externally on a greatly reduced scale.

The unit show in FIG. 1 has a projection screen 2, an automatic microfilm-selecting keyboard 3, a switch-on knob 4, a knob controlling the movement of photograms 5, a regulating device 6 and other possible controls. A characteristic feature inside the unit is the reels' general carrier which is a spool consisting of a faceted cylinder 7 operating in conjunction with the terminal flanges 8, 9. The spool, driven by an electric motor 10, starts rotating when one of the selecting keys of the keyboard 3 has been pushed down, which action electromagnetically releases the catch 11 and frees the reel carrier and supplies current to the motor 10.

The current is automatically cut off and the spool newly clamped when the selected film is in the right position for being projected, i.e. when it coincides with the optical means that consists of a lamp 12, a first lens 13 and a set of second lenses 14. The spool carrying the microfilms stops automatically because in the course of its rotation it frees, one after another, the contacts 15 placed in a circle, on a circular support 16 that faces one of the spool's flanges, and precisely flange 9. The disconnection of contacts is of no consequence until the contract belonging to the circuit that has been closed by pressing the selecting key, has been cut off. Then, the relay 17 that cuts off the current fed to the motor 10 and to the electromagnet 11, is released, and consequently the motor stops and the spool gets clamped.

The opening in succession of contacts 15 on flange 9 is brought about by a permanent magnet 18 that passing close to the contacts 15 consisting of steel springs, attracts the spring and temporarily opens the contact which—as the magnet follows its course—closes itself spontaneously. When the spool stops and gets clamped, the selected microfilm is in the right position for being projected and is in fact projected onto the screen 2. Naturally, only one photogram is then projected and in order to change it, one has to operate on either one or the other of the two reels so as to displace the photogram in one of the two opposite directions. The microfilm is set in motion through a direct action on one of its winding reels, obtained by running motor 19 or 20, while electromagnet 21 or electromagnet 22 brings in contact with the reel concerned, the head 19' or 20' of a driving shaft. The drive, in one direction or the other, is obtained by handling the contact lever 5 that will feed the current to either motor 19 or motor 20, which motors are endowed with a two-speed gear, low and high, for slow passage from one photogram to the next one or for fast running from one point of the microfilm to other very remote ones. By shifting switch 4 that feeds the current to the set, projecting lamp 12 lights up immediately and motor 23 that drives the lamp's cooling fan, starts running.

Figure 4:
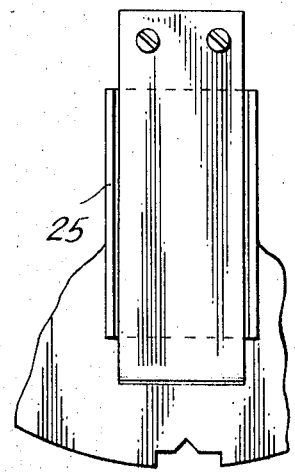
FIGS. 2, 3 and 4 represent schematically in its approximate actual size, a microfilm reel with stand and rotating member.
Figure 2:
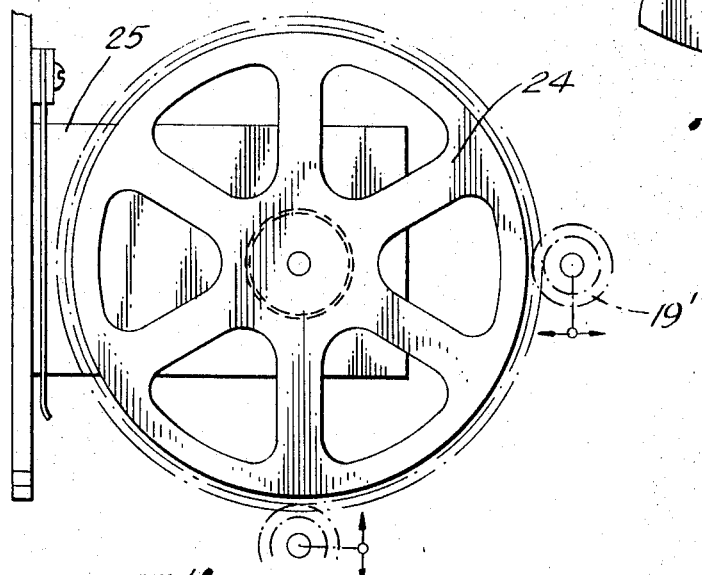
Figure 3:
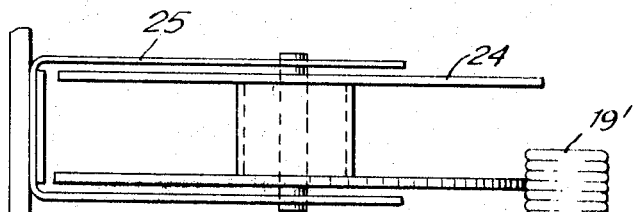
Figure 5:
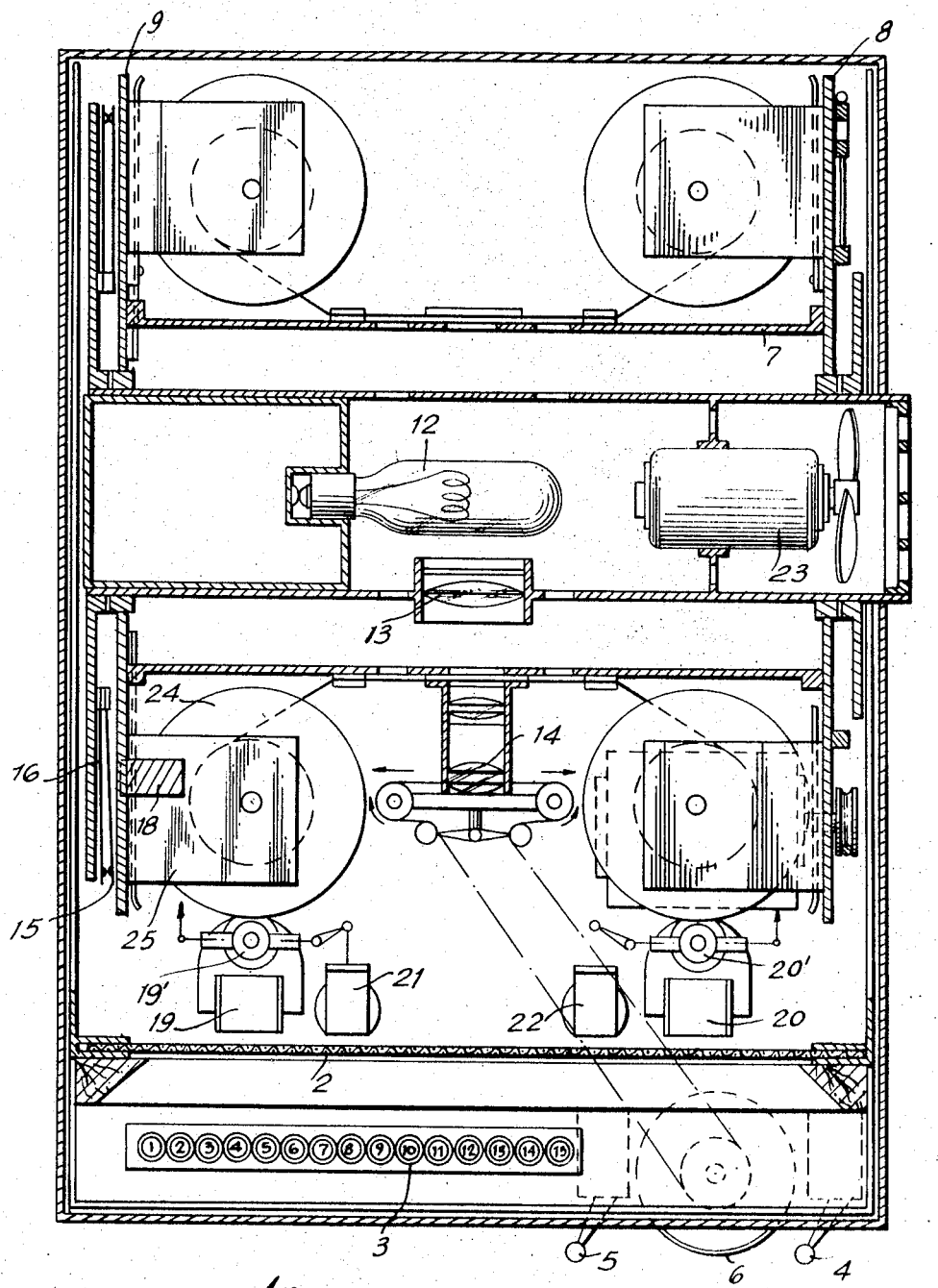
FIG. 5 is a horizontal cross section of the unit on a larger scale than FIG. 1, but smaller than its actual size.
Figure 6:
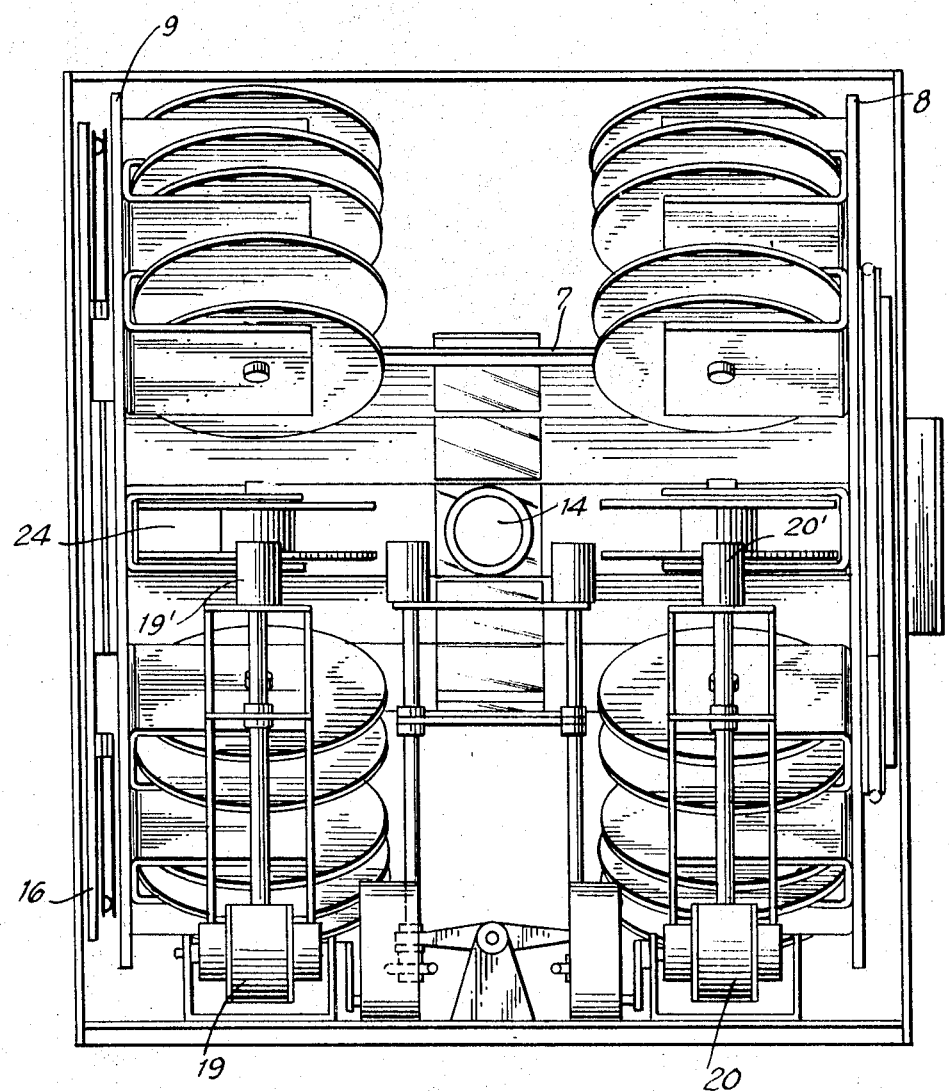
FIG. 6 is a schematic, internal, front view of the unit, seen from behind the screen.
Figure 7:
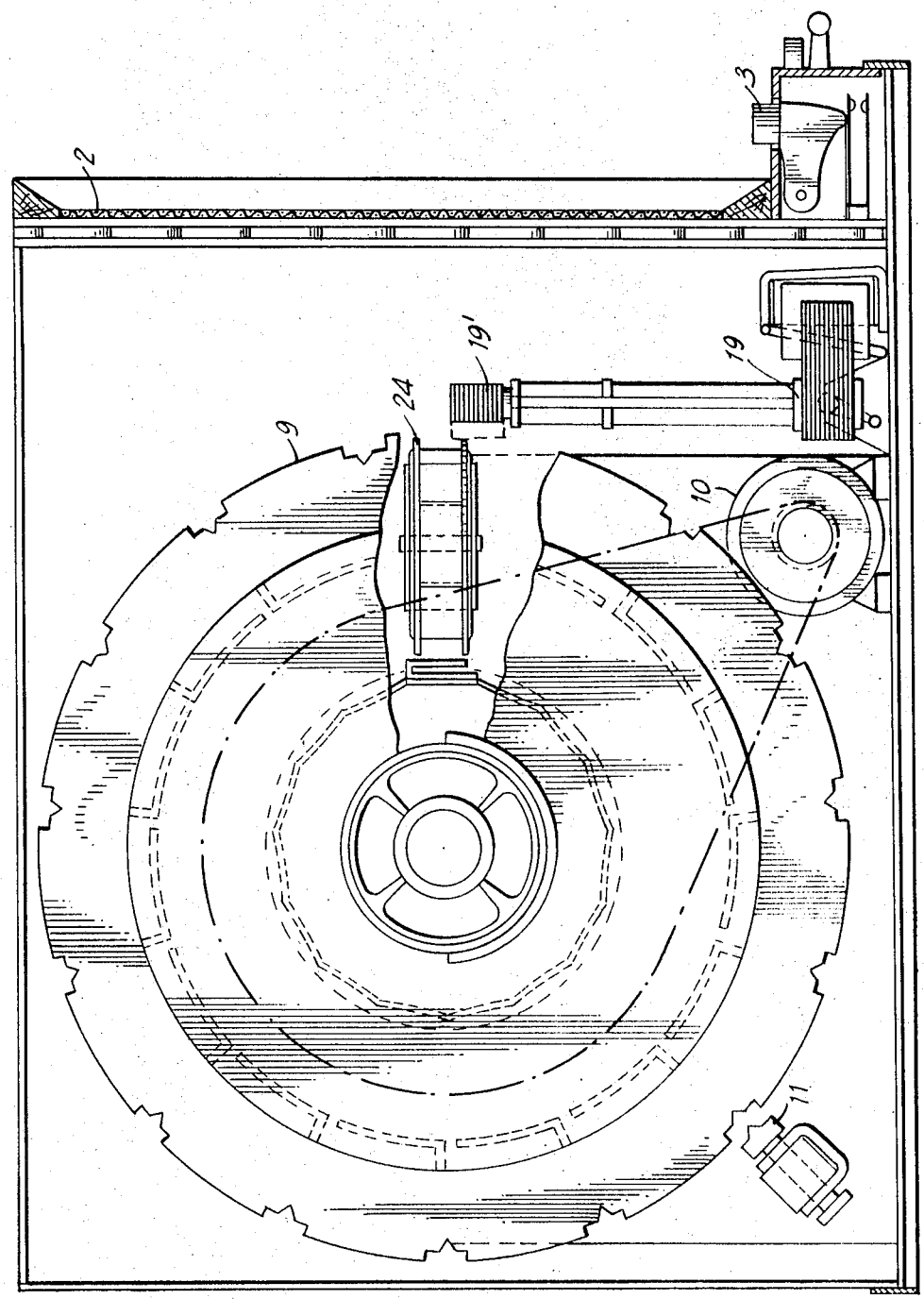
FIG. 7 is a schematic internal side view of the unit.
Figure 8:
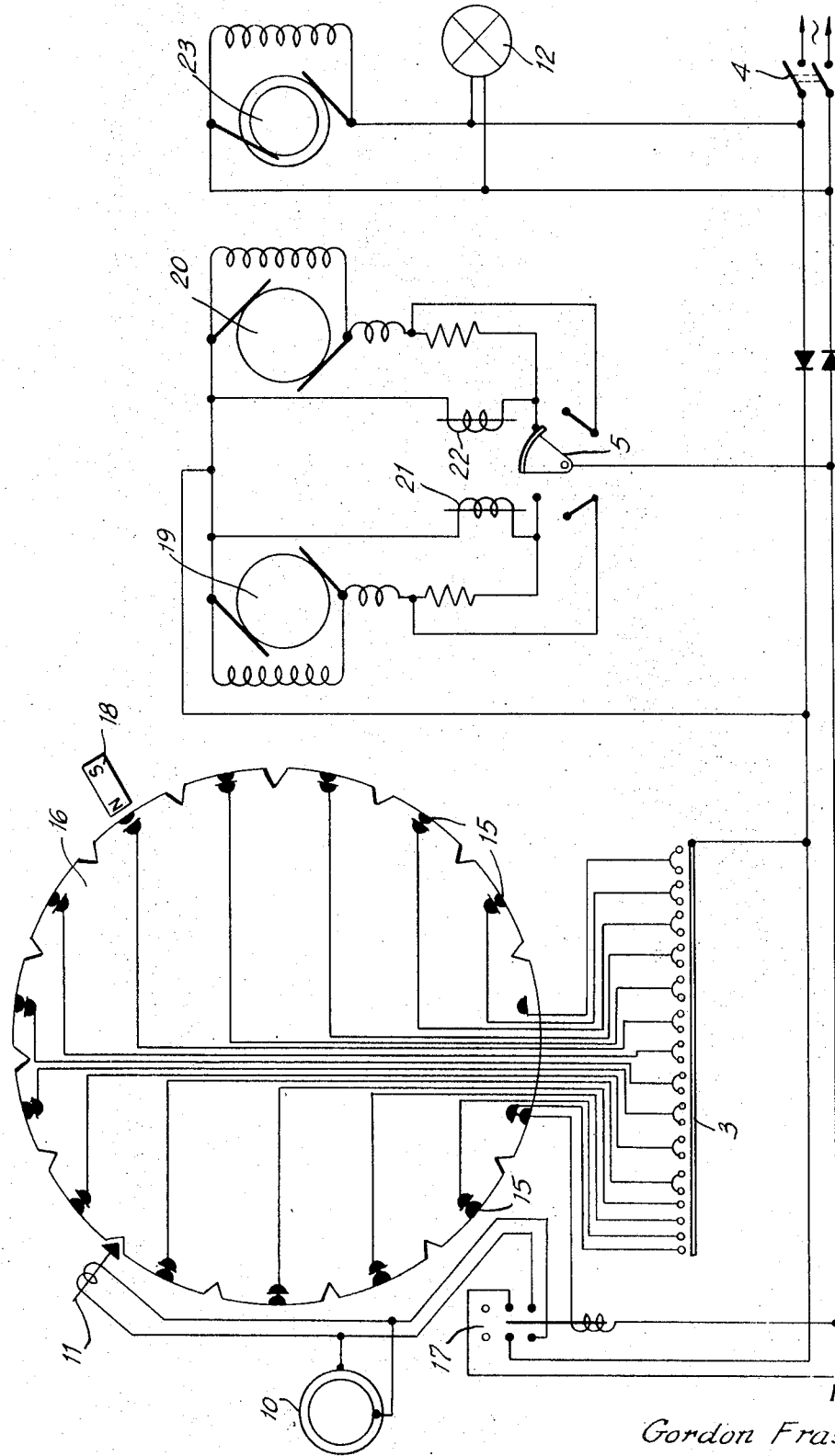
FIG. 8 shows the wiring scheme of the unit.

Every winding reel 24 of a microfilm rotates on a supporting bracket. The bracket may be slipped into its special seat on the spool, or slipped off, so that it is an easy matter to lodge a microfilm in the unit or remove it (see FIGS. 2, 3 and 4).

I claim as my invention:

1. A microfilm projector with selection mechanism, made up of a base, upon which is mounted side panels to support a central stationary tube which in turn serves as the axle of a revolving drum, said revolving drum having flanges on which are mounted a number of reels, one serving as driven reel, the other serving as a payout reel, having a film so mounted on and between them as to permit movement across a projecting light beam, said light beam originating in the central stationary tube, through an opening in said tube, thence through an opening in the revolving drum, thence through the film stretched from the driven reel to the payout reel, into a projecting lens mounted on a pedestal supported by aforementioned base, thence to a rear projection screen where image on film is reproduced; and mounted on aforementioned base, two electric motors, rotating in opposite directions, having each an electric solenoid to effect engagement of driving pinion, mounted on the motor, with the rim of driven reel, said solenoid having an armature mechanically connected to said motor in such manner as to move motor on a pivotal mount to engage and disengage said driving pinion on motor, said solenoid being controlled by means of a switch, single-pole, double-throw, with speed control incorporated in said switch to effect fast or slow motion of film across projection beam; and mounted on the aforementioned base, a series of electrical contacts, equal in number to the number of pairs of reels, each contact with a numbered or lettered button to close said contact by pressing, and open by releasing, causing the closing of an electric circuit to actuate a magnetic relay, mounted on the aforementioned base, the magnetic relay in turn controlling the circuitry to start and stop an electric motor, mounted on aforementioned, base, said motor driving a belt which in turn drives rotation of aforementioned drum, and the flange of said drum having mounted on it and so placed as to revolve with the drum, a permanent magnet actuating spring contacts, equal in number to the number of reels on said flange, mounted on a subpanel of supporting panel, arranged in a circle, whose radius is equal to the radius of the circle described by said permanent magnet rotating with the flange of said drum, said spring contacts being of sufficient length to cause said drum to lose part of its momentum to allow engagement of solenoid actuated plunger, mounted on aforementioned base, in specially formed slots cut in periphery of drum flange, such slots being so formed as to secure drum in precise alignment with projection light beam, opening in body of drum, and opening in central stationary tube, and with selected reel of film, actuation of said spring contacts by permanent magnet opens contacts, thus cutting off electric power to motor rotating drum, when permanent magnet passes before contacts corresponding to selected position of drum, all other contacts remaining closed thus enabling further selection by pressing another button of series of electrical contacts, all of which are normally open when no selection is being made.